United States Patent
Chen

(10) Patent No.: US 7,303,060 B1
(45) Date of Patent: Dec. 4, 2007

(54) MATERIAL CONVEYING SYSTEM WITHOUT DUST RISING

(75) Inventor: Chih-Ching Chen, Taipei Hsien (TW)

(73) Assignee: Chicony Electronics Co., Ltd. (TW)

( * ) Notice: Subject to any disclaimer, the term of this patent is extended or adjusted under 35 U.S.C. 154(b) by 0 days.

(21) Appl. No.: 11/723,477

(22) Filed: Mar. 20, 2007

(30) Foreign Application Priority Data

Apr. 10, 2006 (TW) ................................. 95112620 A

(51) Int. Cl.
*B65G 37/00* (2006.01)
(52) U.S. Cl. .................................... 198/465.2; 198/580
(58) Field of Classification Search ............. 198/465.2, 198/580
See application file for complete search history.

(56) References Cited

U.S. PATENT DOCUMENTS

| | | | | | |
|---|---|---|---|---|---|
| 3,656,272 | A | * | 4/1972 | Sheetz | 53/473 |
| 3,792,844 | A | * | 2/1974 | Berry et al. | 266/117 |
| 3,848,459 | A | * | 11/1974 | Davidson et al. | 73/41.2 |
| 3,886,063 | A | * | 5/1975 | Friesz | 209/44 |
| 4,189,994 | A | * | 2/1980 | Schmader | 99/405 |
| 4,235,707 | A | * | 11/1980 | Burke, Jr. | 209/3 |
| 4,271,107 | A | * | 6/1981 | Phipps | 264/51 |
| 4,763,392 | A | * | 8/1988 | Fogal et al. | 427/327 |
| 4,771,681 | A | * | 9/1988 | Nagata | 99/483 |
| 5,009,395 | A | * | 4/1991 | Pfaffmann | 266/92 |
| 5,704,733 | A | * | 1/1998 | de Greef | 406/79 |
| 5,704,979 | A | * | 1/1998 | Jorgens | 118/423 |
| 5,810,987 | A | * | 9/1998 | Opitz | 204/512 |
| 6,190,718 | B1 | * | 2/2001 | Eek et al. | 426/524 |
| 6,267,124 | B1 | * | 7/2001 | Bowden | 134/71 |
| 6,349,549 | B1 | * | 2/2002 | Angus et al. | 62/64 |
| 6,372,107 | B1 | * | 4/2002 | Besinger et al. | 204/479 |
| 6,408,743 | B2 | * | 6/2002 | Niwa et al. | 101/35 |
| 6,506,260 | B1 | * | 1/2003 | Hiraishi et al. | 134/15 |
| 6,527,124 | B1 | * | 3/2003 | Nakhei-Nejad | 209/173 |
| 6,616,385 | B1 | * | 9/2003 | Raginskii et al. | 406/85 |
| 6,619,889 | B1 | * | 9/2003 | Sinker et al. | 406/92 |
| 6,655,878 | B1 | * | 12/2003 | de Vos et al. | 406/77 |
| 6,688,946 | B2 | * | 2/2004 | Schmidt | 451/38 |
| 6,840,715 | B2 | * | 1/2005 | Crovara Pescia | 406/92 |
| 7,159,373 | B2 | * | 1/2007 | Blanc | 53/244 |
| 7,179,160 | B2 | * | 2/2007 | Hulin | 452/2 |

* cited by examiner

*Primary Examiner*—Joe Dillon, Jr.
(74) *Attorney, Agent, or Firm*—Raymond J. Ho; Venable LLP

(57) ABSTRACT

A material conveying system without dust rising, having a plurality of trays; a transmission mechanism, for carrying the trays and transmitting the trays in motion; and a controller, for controlling the transmission mechanism, is characterized in that the material conveying system without dust rising further has a tank, which carries a liquid, where the transmission mechanism is immersed so that the dust resulting from abrasion of the transmission mechanism cannot float in the air.

5 Claims, 1 Drawing Sheet

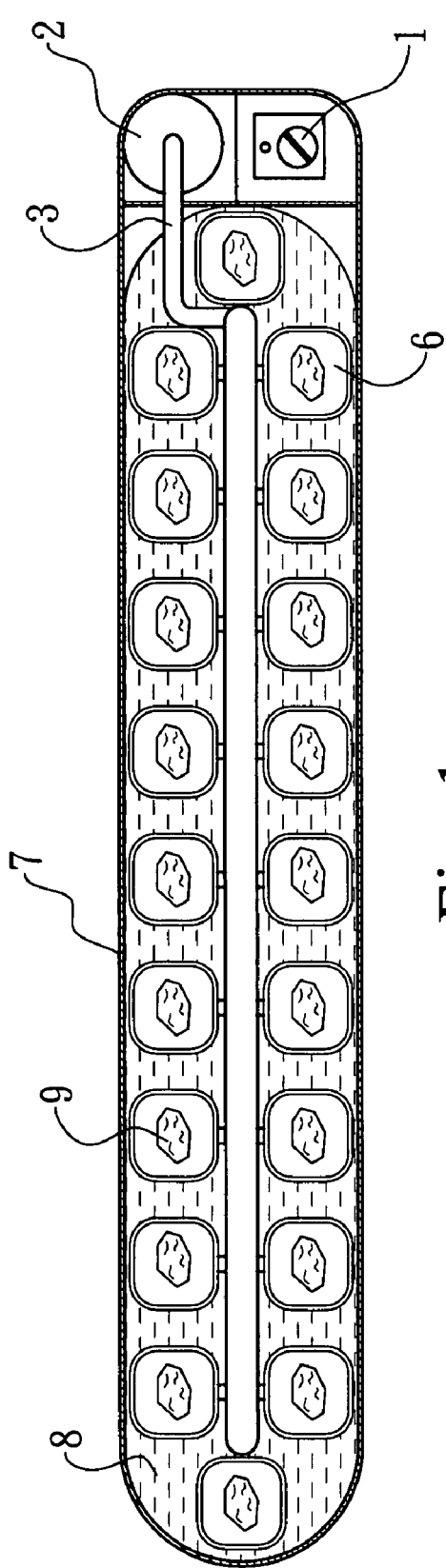
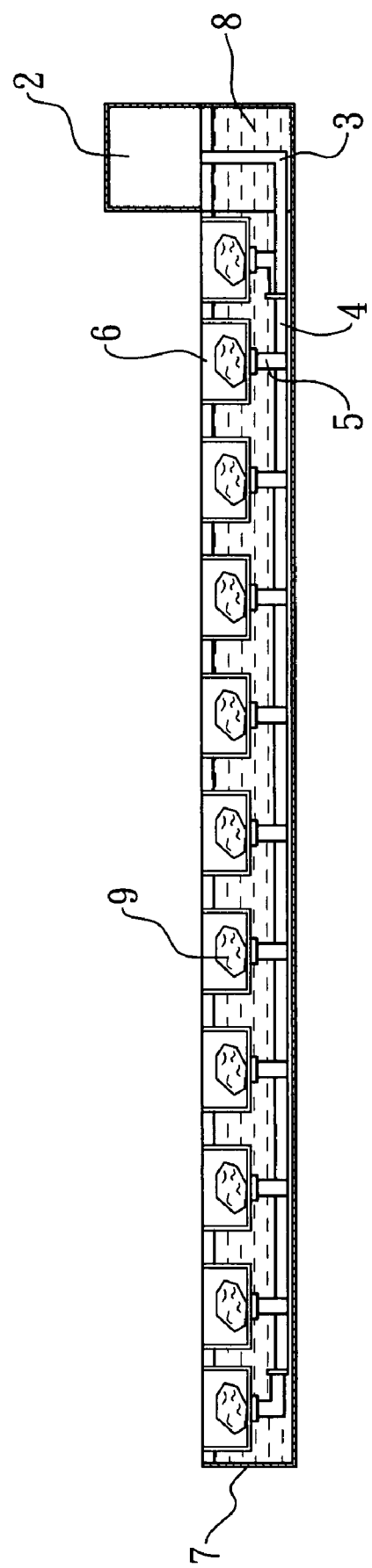
Fig. 1
Fig. 2

MATERIAL CONVEYING SYSTEM WITHOUT DUST RISING

BACKGROUND OF THE INVENTION

1. Field of the Invention

The present invention relates to a material conveying system and, in particular, to a material conveying system without dust rising, having the transmission shaft and the chain belt thereof immersed in a liquid so as to keep the material from being contaminated by abraded dust.

2. Descriptions of the Related Art

Most of the traditional material conveying systems have an effect of moving the material by a motor that is linked to a transmission shaft, which in turns drives a chain belt with the chain belt linked to trays or a transport belt. However, the mechanical structure of the material conveying system, which is constituted by the transmission shaft and the chain belt, is bound to have abrasion as a result of long-term use. The abraded dust will float in the space and probably contaminate the material conveyed by the system. Therefore, contamination may be made in the transportation of material that requires high precision and does not allow dust contamination, to decrease the yield or to cause flaws. Therefore, in current operating environments in dust-free rooms, transport-belt material conveying systems are used seldom for the sake of reducing the contamination of dust. However, for the purpose for orientating to the automation of production chain, there is an urgent need for a material conveying system without dust rising, in which the contamination of dust occurs unlikely.

SUMMARY OF THE INVENTION

The present invention relates to a material conveying system without dust rising, for the objective to improve the traditional material conveying system, wherein the material conveying system without dust rising has the transmission shaft and the chain belt thereof immersed in a liquid so as for the abraded dust resulting from long-term use of the transmission shaft and the chain belt to be contained in the liquid, but not to float in the space, and thereby for the material to be kept from being contaminated by abraded dust.

To achieve the objective described above, the material conveying system without dust rising has a plurality of trays; a transmission mechanism, for carrying the trays and transmitting the trays in motion; and a controller, for controlling the transmission mechanism, the system characterized in that the material conveying system without dust rising further has a tank, which carries a liquid, where the transmission mechanism is immersed in the liquid so that the dust resulting from abrasion of the transmission mechanism cannot float in the air.

Preferably, the liquid has low volatility, low combustibility, no toxicity, and low corrosiveness, for more safety and for preventing the mechanism that is immersed in the liquid from being corroded.

BRIEF DESCRIPTION OF THE DRAWINGS

FIG. 1 is a top view of a first embodiment of the material conveying system without dust rising according to the present invention.

FIG. 2 is a cross sectional view of a second embodiment of the material conveying system without dust rising according to the present invention.

DETAILED DESCRIPTION OF THE INVENTION

The present invention will be described fully with reference to the accompanying drawings provided with preferred embodiments of the invention, but it will be understood, prior to this description, that modifications of the invention described herein may be made by those skilled in the art while the functions of the invention can be achieved. Therefore, it will be understood that the following description is a general disclosure to those skilled in the art and the content thereof is not intended to limit the present invention.

Refer to FIGS. 1 and 2, which show a top view and a cross sectional view, respectively, of an embodiment of the material conveying system without dust rising according to the present invention. In this preferred embodiment, the material conveying system without dust rising according to the present invention comprises: a controller 1, electrically connected to a motor 2, for controlling the switch and rotation rate of the motor 2; a motor 2, electrically connected to the controller 1 and linked to a transmission shaft 3, for supplying power to the material conveying system without dust rising; a transmission shaft 3, linked to the motor 2 by one end and to a chain belt 4 by another one end, for transmitting the chain belt 4; a chain belt 4, driven by the transmission shaft 3, having a plurality of contacts disposed thereon, each of which is respectively connected to one of a plurality of tray holders 5; a plurality of tray holders 5, each of which is connected to the chain belt 4 by one end and to one of a plurality of trays 6 by the other end; a plurality of trays 6, each of which has the bottom end thereof connected to one of the tray holders 5, and having the face thereof for carrying material 9 to convey; a tank 7, filled with a liquid 8, in which the mechanical structure constituted by the transmission shaft 3, the chain belt 4 and the tray holders 5 is immersed. In transportation of material, the material 9 may be placed on the trays 6 so as to be transported.

According to this preferred embodiment of the present invention, in the transportation of the material 9 by the conveying system, the mechanical structure constituted by the transmission shaft 3, the chain belt 4 and the tray holders 5 is immersed in the liquid 8 so that the dust resulting from abrasion between those members is kept in the liquid 8 but not floats in the air. Thus, reduction of the concentration of dust in the air may be facilitated. The material conveying system according to the present invention is especially applicable, for example, to clean rooms or to production lines strictly requiring the air quality. In preferred embodiments, the liquid 8 in the tank 7 is preferably a liquid having low volatility, low combustibility, no toxicity, and low corrosiveness, such as silicone oil.

What is claimed is:

1. A material conveying system without dust rising, having a plurality of trays; a transmission mechanism, for carrying the trays and transmitting the trays in motion; and a controller, for controlling said transmission mechanism, the system characterized in that:

said material conveying system without dust rising further has a tank, which carries a liquid, where said transmission mechanism is entirely immersed during conveyance while a top portion of said trays remains above said liquid.

2. The material conveying system without dust rising according to claim 1, wherein said transmission mechanism comprises: a transmission shaft, driven by a motor; and a chain belt, driven by the transmission shaft and carrying the trays.

3. The material conveying system without dust rising according to claim 2, wherein said transmission mechanism further comprises: a plurality of tray holders, each of which is mounted on the chain belt, respectively, so as to hold the plurality of trays.

4. The material conveying system without dust rising according to claim 1, wherein said liquid has low volatility, low combustibility, no toxicity, and low corrosiveness.

5. The material conveying system without dust rising according to claim 1, wherein said liquid is silicone oil.

\* \* \* \* \*